United States Patent [19]

Gerhart et al.

[11] Patent Number: 4,872,186
[45] Date of Patent: Oct. 3, 1989

[54] APPARATUS AND METHOD FOR IDENTIFICATION OF MESSAGE INITIATION IN A PROCESS CONTROL NETWORK

[75] Inventors: Paul B. Gerhart, Horsham, Pa.; Yasuo Kumeda, Yokohama, Japan

[73] Assignee: Honeywell Inc., Minneapolis, Minn.

[21] Appl. No.: 121,561

[22] Filed: Nov. 17, 1987

[51] Int. Cl.⁴ ............................................. H04L 25/48
[52] U.S. Cl. ..................................... 375/117; 370/49; 370/101
[58] Field of Search ...................... 375/106, 116, 117; 340/825.62; 370/101, 48, 49, 99

[56] References Cited

U.S. PATENT DOCUMENTS

| | | | |
|---|---|---|---|
| 4,310,922 | 1/1982 | Lichtenberger et al. | 370/101 |
| 4,471,481 | 9/1984 | Shaw et al. | 370/101 |
| 4,748,643 | 5/1983 | Setoguchi et al. | 375/117 |

Primary Examiner—Bendict V. Safourek
Attorney, Agent, or Firm—William W. Holloway; Donald J. Lenkszus; Arthur A. Sapelli

[57] ABSTRACT

In order to insure the accuracy of information transmitted over a network, the initiation of the message must be unambiguously identified. In the present invention, the intermessage spacing consists of a series of identical logic signals that exceeds a minimum value distinguishing this interval from a message character. The message character has predefined length, with a start bit position logic signal and a stop bit position logic signal bounding the character that has the same number of predetermined logic signals for every message character. The character has at least one additional non-data bit position that has a first logic signal for the initial character of a message and the complementary logic signal for the remaining characters in the message.

15 Claims, 3 Drawing Sheets

APPARATUS AND METHOD FOR IDENTIFICATION OF MESSAGE INITIATION IN A PROCESS CONTROL NETWORK

BACKGROUND OF THE INVENTION

1. Field of the Invention

This invention relates generally to networks that receive and transmit groups of logic signals from remote locations and, more particularly, to apparatus and method for insuring the accuracy of the information transmitted between the local and the remote locations by unambiguously identifying the initiation of a message on the network.

2. Description of the Related Art

In the automatic control of processes, process control networks are provided to collect status information by at least one central location and to distribute control signals to the devices coupled to the network. Referring to FIG. 1, a portion of such a process control network is shown. The process control network includes a system bus 5 which has at least one central control unit 6 coupled thereto and at least one bus interface module 9 also coupled thereto. The central control unit 6 receives signals from the system bus 5 that typically communicate the status of user devices coupled to the process control network and applies signals to the network that provide the control signals determining the operation of the user devices. The bus interface unit 9 applies status signals to the system bus and receives signals from the system bus 5 which are relevant to a subset of network user devices 10 that communicate with the central control unit 6 through bus interface unit 9. User devices 10, (such as motors, lamps and heaters), responding to digital signals, receive control signals through device interface unit 16 and digital output module 12 from the bus interface unit 9. User devices 10 providing digital status signals in response to contact closures provide status signals to the bus interface unit 9 by means of device interface unit 17 and digital input module 13. User devices 10, (such as control valves), responding to analog control signals, receive signals from the bus interface unit 9 by means of output analog module 14 and device interface unit 18. User devices 10, (such as flowmeters, level detectors, pressure meters etc.), of the type providing analog status information, provide the status signals to bus interface unit through interface module 19 and analog input module 15. The device interface units 16, 17, 18 and 19 convert the signals received from and transmitted to the user devices into a format usable by the digital output and input modules and the analog output and input modules, respectively. The digital input and output modules 13 and 12 and the analog input and output modules 15 and 14 couple the signals of the user devices, as transformed by the device interface unit, with the bus interface unit 9 by means of local bus 11.

In the communication between the bus interface unit 9 and the input and output modules, it is necessary to identify the initiation of a message. Otherwise, the initial portion of the message may be lost and the information compromised. In the related art, several techniques have been used to identify the initiation of a message. The intermessage spacing can have a predetermined value. The receiving unit can clock quiescent period when no message is being transmitted and accept the group of signals immediately following the quiescent period. This technique has not proven satisfactory because malfunction in the receiving apparatus can compromise the receipt of valid information after a period of non-use. Another technique to determine the initiation of a message is the use of a preamble character or group of characters that alerts the receiving apparatus of the presence of a message being transmitted thereafter. The preamble technique requires relatively sophisticated apparatus for the generation and detection and places a relatively great burden of non-information bearing communication on the network.

A need has therefore been felt for apparatus and method that can identify the initiation of a message on a network that relies on a plurality of criteria and which does not require elaborate apparatus to implement and which does not appreciably increase the traffic on the network.

FEATURES OF THE INVENTION

It is an object of the present invention to provide an improved network for transmission of messages.

It is a feature of the present invention to provide an improved network for transmission of process control information.

It is another feature of the present invention to provide an improved process control network in which the initiation of a message can be identified by receiving network member.

It is another feature of the present invention to provide an improved process control network in which the start of a message can be identified by a plurality of characteristics.

It is still another feature of the present invention to provide an improved process control network in which the intermessage spacing has a minimum value and in which the first character of a message can be distinguished from the remaining characters of the message.

It is yet another feature of the present invention to provide an improved process control network wherein a message is comprised of a plurality of characters, each character having a data field and at least one control field, wherein at least one bit position of the control field distinguishes the first character of a message from the remaining characters of the message.

SUMMARY OF THE INVENTION

The aforementioned and other features are accomplished, according to the present invention, by identifying the initiation of a message by several indicia. The interval between messages is accompanied by a series of identical selected logic signals applied to the network bus. The number of these identical logic signals must exceed a certain value before the signal sequence is identified as a intermessage interval. The messages are comprised of a plurality of characters having a preselected format. The format includes a data field, a start field, a stop field and a third field. The start field and stop field have logic signals associated therewith. With respect to the third field, in the preferred embodiment the third field has a first logic signal when the character is the first character of a message and has the inverse logic signal for the remaining characters of the message.

These and other features of the present invention will be understood upon reading of the following description along with the drawings.

BRIEF DESCRIPTION OF THE DRAWINGS

FIG. 2A illustrates the features of two messages applied to the network bus, while

DESCRIPTION OF THE PREFERRED EMBODIMENT

1. Detailed Description of the Figures

Figure 1:
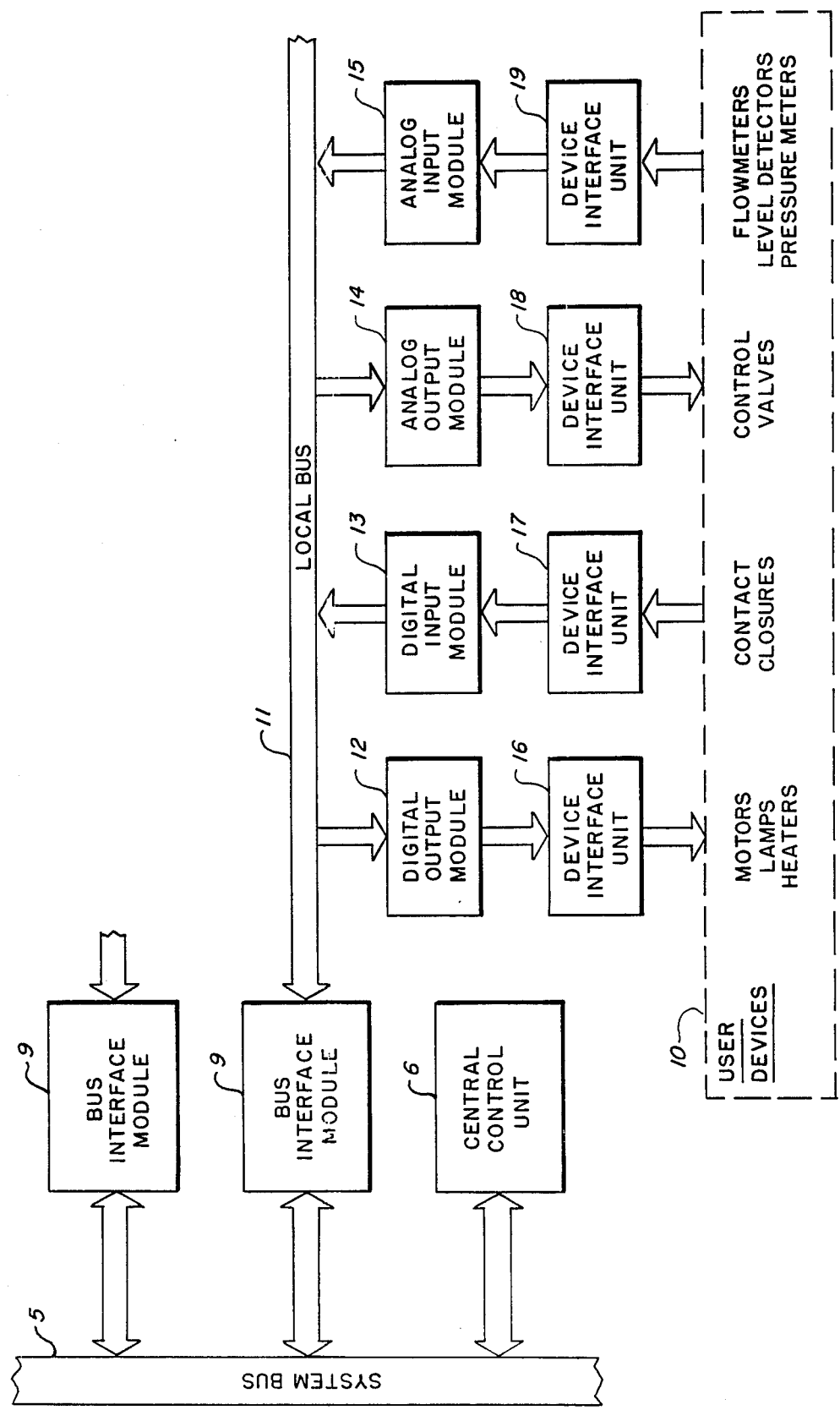
FIG. 1 is a block diagram of a process control network capable of using the present invention.

FIG. 1 has been described with reference to the related art.

Figure 2A:
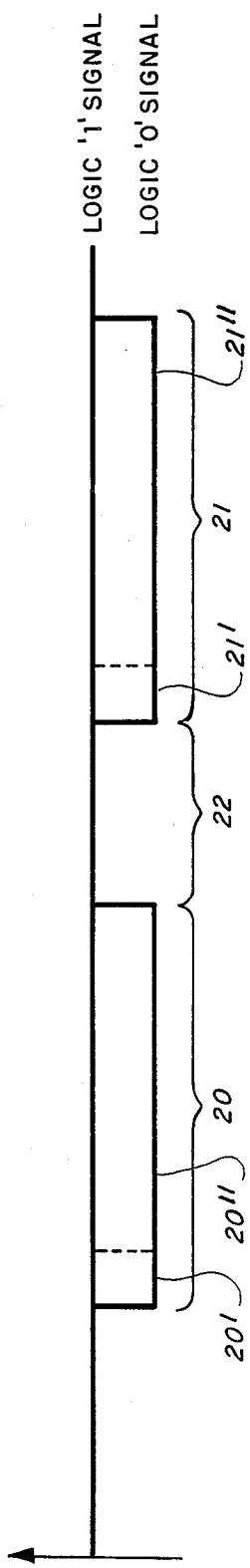
Figure 2B:
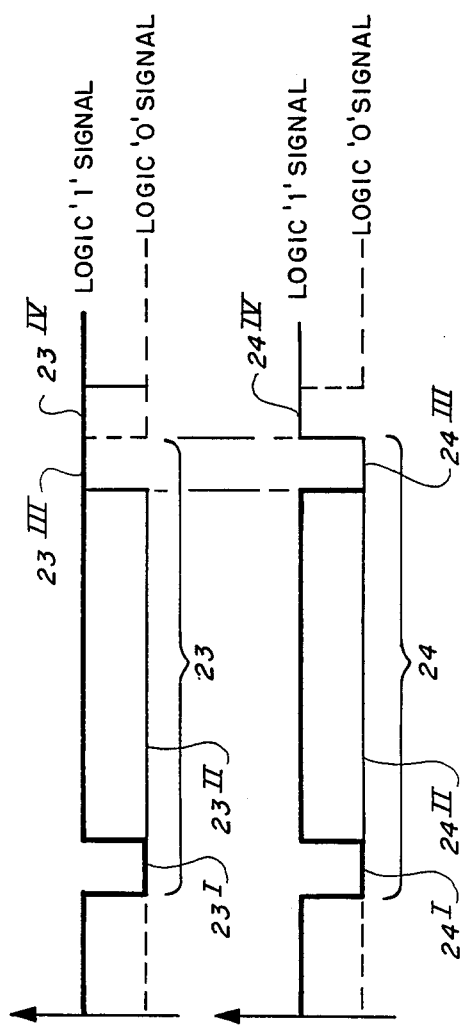
FIG. 2B is a diagram of a message character when the message character is in the first and in a non-first position of a message according to the preferred embodiment.

Referring now to FIG. 2A, a first message 20 is followed after an intermessage distance 22 by message 21. Message 20 includes a first message character $20^I$ and a plurality of non-first message characters $20^{II}$. Similarly, the next consecutive message 21 has a first message character $21^I$ and a plurality of non-first message characters $21^{II}$. The intermessage interval 22 has plurality of logic '1' signals in the interval. FIG. 2B illustrates the format of a message character 23 when the message character is in the first position of a message and a message character 24 when the message character is not in the first message position. The message character 23 includes a start field $23^I$ or first bit position that is chosen as a logic '0' signal (after the logic '1' signals of the intermessage interval). The first message character 23 includes a stop field $23^{IV}$ or bit position that is selected to be a logic '1' signal. The data (or information conveying) field $23^{II}$ follows the start field $23^I$ and has generally unpredictable logic signals, the logic signal depending on the information to be conveyed by that character. The alert field $23^{III}$ or bit position is interposed between the data field $23^{III}$ and the stop field $23^{IV}$. The alert field is a logic '1' signal when the message character 23 is the first character of the message. For any message character 24 following the first message character, the start field $24^I$ is a logic '0' signal, the stop field $24^{IV}$ is a logic '1' signal and the data field $24^{II}$ is determined by the information to be conveyed by the character. The alert field $24^{III}$ is a logic '0' signal when the character is not the first character of the message.

Figure 3:
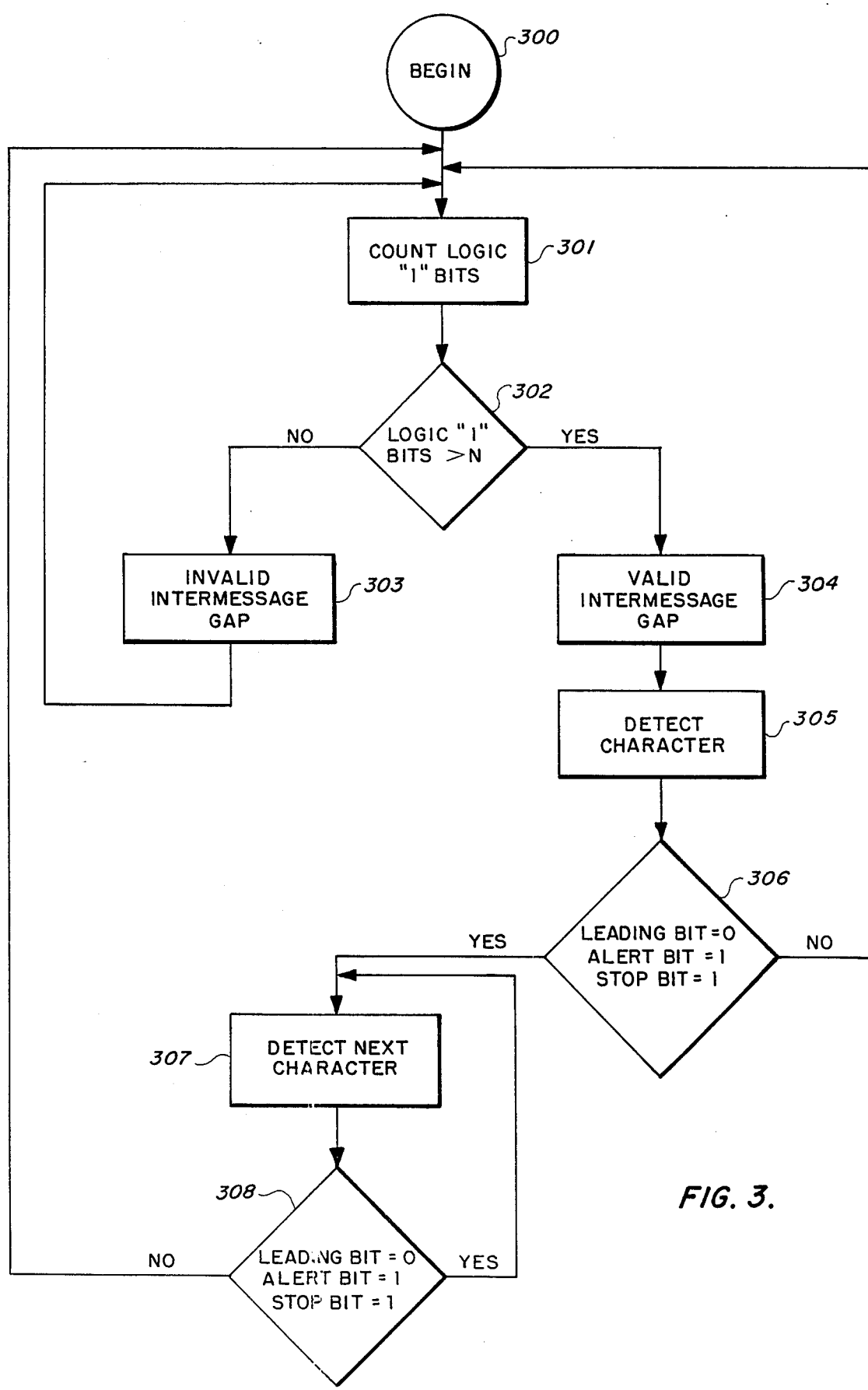
FIG. 3 is a logic flow diagram illustrating the steps in determining when a character is a first character of a message.

Referring next to FIG. 3, the procedure for identifying the first character position of a message is shown. After the begin step 300, the receiving unit counts the number of logic '1' signals in step 301. In step 302, when a non-logic '1' signal is received prior to a count of N, indicating that the interval between the messages is less than the lowest allowable value. In this situation, a determination is made that an invalid intermessage gap has occurred in step 303 and the count of logic '1' signals is begun again. When the count of logic '1' signals exceeds the value N, then, a valid intermessage interval is identified in step 304. After the determination of a valid intermessage interval, then the receiving unit determines whether the start field is a logic '0' signals, the stop field is a logic '1' signal and the alert field is a logic '1' signal in step 306. When any of these tests are negative, than the character is identified a non-first character of a message in a position that should include the first message character and a return is made to step 301 to resume the counting of logic '1' signals on the bus.

When all three conditions of step 306 are valid, then the next character is detected in step 307. In step 308, tests are made to determine when the start field is a logic '0' signal, the stop field is a logic '1' signal and the alert bit is a logic '0' signal. When all of these tests are positive, The character is a legitimate character of a message, other than the first character and a return is made to step 307 to detect the next character and determine if the character is a legitimate message character in step 308. When any of the conditions of step 308 are not met, the procedure returns to step 301 to determine the presence of a valid intermessage interval and to identify a first message character.

2. Operation of the Preferred Embodiment

The identification of an initial message character depends on several factors. First, an intermessage interval that meets the criterion of exceeding a certain interval must be detected. Next, the format of each character is specified in the preferred embodiment, a character is 11 bit positions in length. A first and a last field (i.e., bit position) of the character are specified with respect to what logic signal should be stored therein. The data field consists of 8 bit positions following the start field. And finally, the next to the last (alert) field can take on two possible logic signals. When the alert field is a logic '1' signal, the associated character is (or should be) the first message character entity. When the next to last (alert) position field is a logic '0' signal, then the associated character is (or should be) a message character that is not the first character of a message. Therefore, the detection of a first message character requires that the intermessage interval exceed a certain value and that a specified logic 5 signal be present in a certain character bit location only when the character is in the first message position. This redundancy provides greater integrity in the transfer of information because the starting boundary of a message can be unambiguously identified.

An added feature of the invention is the use of the logic '1' signals during the intermessage interval. These signals help insure that the detection apparatus used by the receiving unit is operative, the detection apparatus being in constant use to identify an intermessage interval. The use of the logic '1' signals also simplifies the interval determination, the determination being obtained by counting the number of consecutive logic '1' signals.

The procedure identified in FIG. 3 can be implemented by appropriate dedicated logic apparatus. In the preferred embodiment, a microprocessor is programmed to execute the procedure. The microprocessor can be used to provide other network functionality in addition to the analysis of the character fields. This procedure can be executed by a general purpose data processing unit such as a microprocessor. The microprocessor and its processing capabilities are described in "Microprocessors" by Daniel R. McGlynn, John Wiley & Sons, Inc., 1976.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. In a process control network, a central processing unit for receiving groups of logic signals from input and output modules of said process control network, each of said group of logic signals forming a message, said each group of logic signals arranged in a plurality of characters having a preselected number of logic signals, said central processing unit comprising:

counting means responsive to said logic signals for determining when a count of a series of logic signals exceeds a predetermined number, said predetermined number indicating an interval between messages, said counting means identifying each character of said group by said preselected number; and comparison means for comparing a logic signal in a first character position with a first logic signal, said comparison means comparing a logic signal in a second character position with a second logic signal, said comparison means comparing a logic signal in a third position with a third logic signal, a positive comparison between said logic signal in said third position and said third logic signal in a character indicating said character is a first character of a group; wherein character positions other than said first character position, said second character position and third character position are used for message data.

2. The central processing unit of claim 1 wherein said first character position is an initial character position of a group, said first character position having said first logic signal associated therewith.

3. The central processing unit of claim 2 wherein said series of logic signals are logic '1' signals, said logic '1' signals verifying operation of said counter means.

4. The central control unit of claim 2 wherein said first logic signal is a logic '0' signal.

5. The central control unit of claim 4 wherein said second character position is a final character position of a group, said second logic signal being a logic '1' signal.

6. A system for transmitting messages of a multiplicity of logic signals over a network, said system comprising:

a system bus; a first processing unit for applying message logic signals to said system bus; and a second processing unit for receiving message logic signals from said system bus, wherein said first processing unit is adapted to generate and said second processing unit is adapted to receive message logic signals including at least one logic signal character having a preselected format of logic signals, wherein said preselected format has first logic signal in a first position of said character, said preselected format having a second logic signal in a last position of said character, said preselected format having a preestablished logic signal in a preestablished position of said character when said character is a first character of said message logic signal.

7. The system for transmitting messages of claim 6 wherein said first processing unit applies to said system bus at least a selected number of said second logic signals between messages.

8. The system for transmitting messages of claim 7 wherein said first logic signal is a logic '0' signal and said second logic signal is a logic '0' signal.

9. The system for transmitting messages over a network of claim 8 wherein said preestablished position is a next to last position of said character.

10. The system for transmitting messages of claim 9 wherein said preestablished logic signal is a logic '1' signal.

11. A method for generating a message of logic signals, said message including a plurality of characters, each character having a preselected number of logic signals, said method comprising the steps of:

providing an inter-message gap comprised of at least a predetermined number of first logic signals;

providing each of said characters of said message with a predetermined logic signal format, said providing said character format including the steps of;

beginning said each character with a second logic signal complementary to said first logic signal, ending each character with said first logic signal, providing a second logic signal in a preselected character position when said character is a first character of said message, and providing a first logic signal when said preselected character position is not a part of said first character of a message.

12. The method for generating a message of claim 11 further comprising the step of selecting said preselected character position to be a next to last character position.

13. The method for generating a message of claim 12 further comprising the step of implementing said first logic signal with a logic "1" signal and said second logic signal with a logic "0" signal.

14. The method of generating a message of claim 12 further comprising the step of implementing each character with 11 bit positions, wherein 8 bit positions include logic signal encoded with data.

15. A process control network comprising:

a system bus;

a central control unit for receiving messages from said system bus and for applying messages to said system bus;

at least one input module for receiving messages from said central control unit, wherein each of said messages includes a plurality of characters, each of said characters having a preselected number of logic signals, wherein a first bit position of said each character has a first logic signal transmitted therein indicating a start of said each character, wherein a last bit position of said each character has a second logic signal transmitted therein indicating an end of said each character, wherein a selected bit position has a predetermined logic signal transmitted therein when said each character is a first character of a message, and wherein said each character has a plurality of preselected positions for transmitting logic signals therein related to data transmitting over the system bus.

* * * * *